United States Patent
Stern et al.

(10) Patent No.: US 8,635,278 B2
(45) Date of Patent: Jan. 21, 2014

(54) SYSTEM AND METHOD FOR INTERRUPTION MANAGEMENT

(75) Inventors: Edith Helen Stern, Yorktown Heights, NY (US); Barry E. Willner, Briarcliff Manor, NY (US); Patrick Joseph O'Sullivan, Ballsbridge (IE); Robert Cameron Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/872,141

(22) Filed: Oct. 15, 2007

(65) Prior Publication Data

US 2009/0100142 A1    Apr. 16, 2009

(51) Int. Cl.
G06F 15/16    (2006.01)
H04M 11/00    (2006.01)

(52) U.S. Cl.
USPC ..................................... 709/205; 379/93.02

(58) Field of Classification Search
USPC ............... 709/206, 205, 224, 207; 379/93.02
See application file for complete search history.

(56) References Cited

U.S. PATENT DOCUMENTS

| | | | |
|---|---|---|---|
| 4,086,441 A | | 4/1978 | Ullakko et al. |
| 4,644,547 A | * | 2/1987 | Vercellotti et al. ............ 709/236 |
| 5,711,672 A | * | 1/1998 | Redford et al. ........... 434/307 R |
| 5,815,554 A | * | 9/1998 | Burgess et al. ............ 379/90.01 |
| 5,960,442 A | * | 9/1999 | Pickering ................. 379/218.01 |
| 6,076,093 A | * | 6/2000 | Pickering ............................. 1/1 |
| 6,247,043 B1 | * | 6/2001 | Bates et al. .................... 709/200 |
| 6,389,127 B1 | * | 5/2002 | Vardi et al. ............... 379/209.01 |
| 6,614,888 B1 | * | 9/2003 | Andreason ................. 379/93.02 |
| 6,618,591 B1 | * | 9/2003 | Kalliokulju et al. ........ 455/452.2 |
| 6,744,737 B1 | * | 6/2004 | Arkko ............................ 370/252 |
| 6,996,226 B2 | * | 2/2006 | Watanabe ................ 379/355.03 |
| 7,129,818 B1 | * | 10/2006 | Begole et al. ............ 340/286.02 |
| 7,496,102 B2 | * | 2/2009 | Chow et al. .................... 370/400 |
| 7,590,727 B1 | * | 9/2009 | Barnes .......................... 709/224 |
| 7,792,053 B1 | * | 9/2010 | Chow et al. .................... 370/254 |
| 2002/0065915 A1 | * | 5/2002 | Anderson et al. ............. 709/225 |
| 2002/0091781 A1 | * | 7/2002 | Yashiki ......................... 709/206 |
| 2003/0215079 A1 | * | 11/2003 | Watanabe ..................... 379/219 |
| 2003/0227927 A1 | * | 12/2003 | Chow et al. .................... 370/400 |
| 2003/0228869 A1 | * | 12/2003 | Chow et al. ................ 455/432.2 |
| 2004/0215723 A1 | * | 10/2004 | Chadha ......................... 709/206 |
| 2004/0223599 A1 | | 11/2004 | Bear et al. |
| 2004/0249776 A1 | * | 12/2004 | Horvitz et al. ................... 706/21 |
| 2005/0198069 A1 | * | 9/2005 | Cherry et al. ............... 707/104.1 |
| 2005/0223075 A1 | * | 10/2005 | Swearingen et al. ......... 709/207 |
| 2005/0249023 A1 | | 11/2005 | Bodlaender |

(Continued)

OTHER PUBLICATIONS

"Please Do Not Disturb", http://www.jgui.net/DND, downloaded Apr. 12, 2013; pp. 1-4.

(Continued)

*Primary Examiner* — Firmin Backer
*Assistant Examiner* — Michael A Chambers
(74) *Attorney, Agent, or Firm* — Holland & Knight LLP; Brian J. Colandreo, Esq.; Jeffrey T. Placker, Esq.

(57) ABSTRACT

A method and computer program product for managing interruptions including defining an interruption control initiation trigger and defining an interruption control release trigger. An interruption control period is initiated based upon, at least in part, the interruption control initiation trigger. The interruption control period is terminated based upon, at least in part, the interruption control release trigger.

20 Claims, 6 Drawing Sheets

(56) References Cited

U.S. PATENT DOCUMENTS

| | | |
|---|---|---|
| 2006/0010206 A1* | 1/2006 | Apacible et al. .............. 709/205 |
| 2006/0036688 A1* | 2/2006 | McMahan et al. ............ 709/206 |
| 2006/0168007 A1* | 7/2006 | Peters ........................... 709/206 |
| 2006/0168073 A1* | 7/2006 | Kogan et al. .................. 709/206 |
| 2006/0242232 A1* | 10/2006 | Murillo et al. ................. 709/204 |
| 2006/0277080 A1* | 12/2006 | DeMartine et al. ............... 705/7 |
| 2007/0094414 A1* | 4/2007 | Das ............................... 709/248 |
| 2007/0130275 A1* | 6/2007 | Maresh ......................... 709/207 |
| 2007/0150545 A1* | 6/2007 | Muller et al. .................. 709/207 |
| 2007/0156832 A1* | 7/2007 | Daniels-Farrar et al. ..... 709/207 |
| 2007/0263825 A1* | 11/2007 | Shah et al. ................ 379/202.01 |
| 2008/0261630 A1* | 10/2008 | Wormald et al. ............. 455/466 |
| 2008/0320088 A1* | 12/2008 | Jung et al. ..................... 709/206 |
| 2009/0138196 A1* | 5/2009 | Laberteaux ................... 701/213 |

OTHER PUBLICATIONS

"iOS 6: Using Do Not Disturb", http://support.apple.com/kb/HT5463, downloaded Apr. 12, 2013, pp. 1-2.

* cited by examiner

SYSTEM AND METHOD FOR INTERRUPTION MANAGEMENT

TECHNICAL FIELD

This disclosure relates to interruption management and, more particularly, to systems and methods for interruption management across multiple communication technologies.

BACKGROUND

Email, instant messaging, text messaging, as well as other communications systems that exist today have converged to leave consumers of the technologies with less control of when and how they are interrupted. Interruptions by way of mail, instant messaging, text messaging, telephone, calendar invites, e-meetings, voice mail, organizational web conferences, cellular, and so on, are hugely time consuming and are oftentimes a nuisance for those who wish to concentrate on a task, or manage their day in relation to tasks they want to get done. Likewise, managers of teams are oftentimes frustrated with outside interruptions distracting members of their team and wish to manage this.

In an attempt to manage interruptions, a person may choose to ignore various communications attempts. Unfortunately, while ignoring the communication attempt may to at least some degree mitigate the interruption, the alerts provided by the communications systems may still result in an interruption. Various communications systems include mechanisms for controlling interruptions, such as do-not-disturb for voice communications and instant messaging. Similarly, email notification systems can be turned off, and so on. However, each of the interruption control mechanisms must be individually set, and later disabled. The number of steps necessary to control interruptions from the various communications systems can be a nuisance in and of itself. Furthermore, because an individual interruption control mechanisms must be disabled for each communication system, there may be a strong likelihood that a user will forget to disable one or more of the interruption control mechanisms, resulting in missed, or delayed communications.

SUMMARY OF DISCLOSURE

In a first implementation, a method includes defining an interruption control initiation trigger and defining an interruption control release trigger. An interruption control period is initiated based upon, at least in part, the interruption control initiation trigger. The interruption control period is terminated based upon, at least in part, the interruption control release trigger.

One or more of the following features may be included. Initiating the interruption control period includes establishing a do-not-disturb status for one or more communication channel. The interruption control initiation trigger may include a user initiation input. Further, the interruption control initiation trigger may include an interruption control request from an application. The application may include one or more of a scheduling application and a communication application.

The interruption control release trigger may include a user release input. Further, the interruption control release trigger may include a release request from an application. The application includes one or more of a scheduling application and a communication application. Additionally, the interruption control release trigger may include a timer. Terminating the interruption control period may include terminating the interruption control period after a predetermined period of time.

The method may further include circumventing the interruption control period based upon, at least in part, a predetermined circumvention policy.

According to another implementation, a computer program product may reside on a non-transitory computer readable medium having a plurality of instructions stored thereon. When executed by a processor the instructions cause the processor to perform operations including defining an interruption control initiation trigger, and defining an interruption control release trigger. An interruption control period is initiated based upon, at least in part, the interruption control initiation trigger. The interruption control period is terminated based upon, at least in part, the interruption control release trigger.

One or more of the following features may be included. The instructions for initiating the interruption control period may include instructions for establishing a do-not-disturb status for one or more communication channel. The interruption control initiation trigger may include a user initiation input. Further, the interruption control initiation trigger may include an interruption control request from an application. The application may include one or more of a scheduling application and a communication application.

The interruption control release trigger may include a user release input. Further, the interruption control release trigger may include a release request from an application. The application may include one or more of a scheduling application and a communication application. Additionally, the interruption control release trigger may include a timer. The instructions for terminating the interruption control period may include instructions for terminating the interruption control period after a predetermined period of time.

The computer program product may additionally include instructions for circumventing the interruption control period based upon, at least in part, a predetermined circumvention policy.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
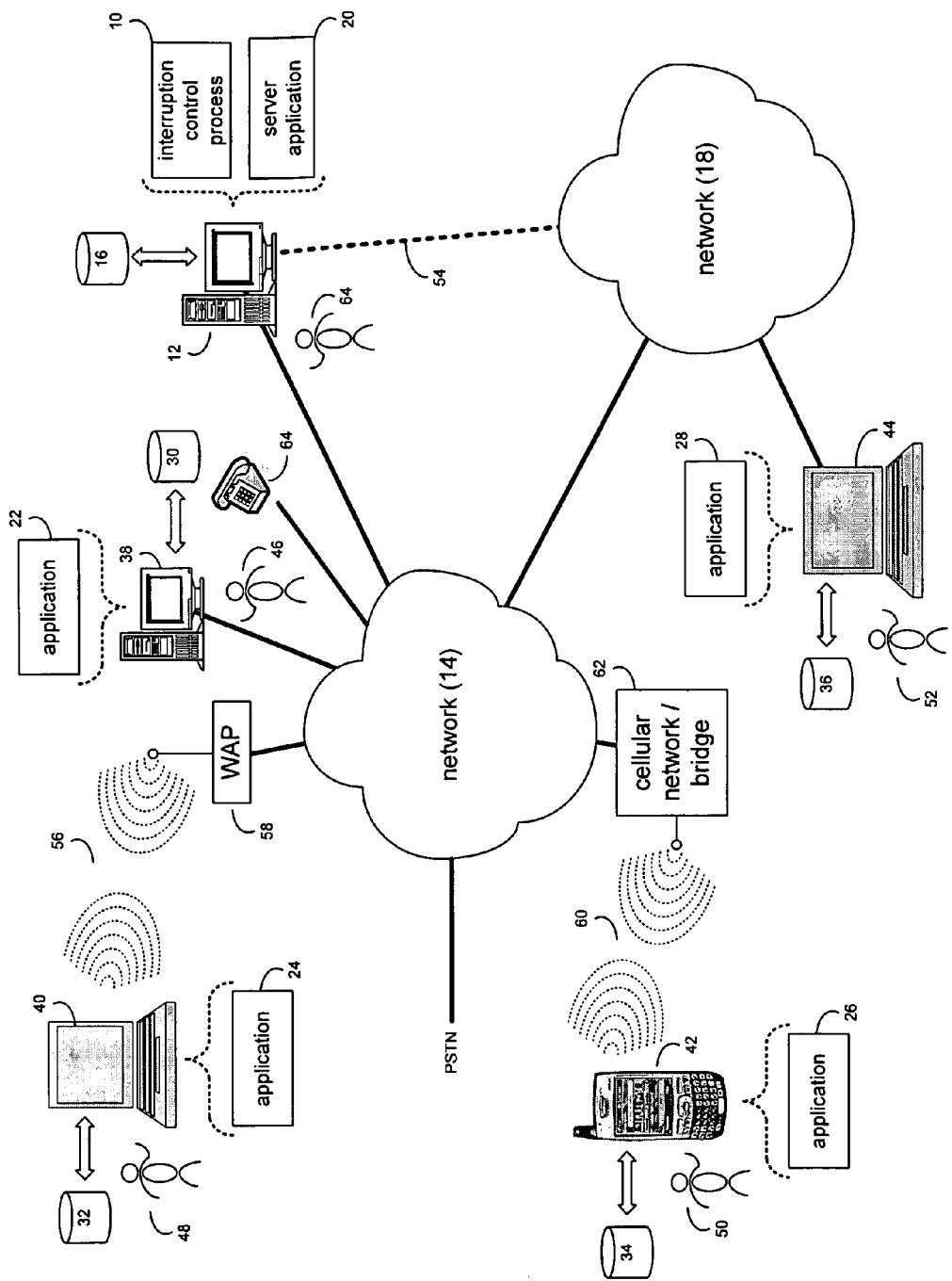
FIG. 1 is a diagrammatic view of a interruption control process and email application coupled to a communication network.

System Overview:

Referring to FIG. 1, there is shown interruption control process 10 that may reside on and may be executed by server computer 12, which may be connected to network 14 (e.g., a communication network, which may include the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, interruption control process 10 may reside on and be executed, in whole or in part, by a client electronic device, such as a personal computer, notebook computer, personal digital assistant, or the like.

As will be discussed below in greater detail, interruption control process 10 may allow an interruption control period to be initiated. The interruption control period may be initiated based upon, at least in part, a defined interruption control initiation trigger. Additionally, interruption control process may terminate the interruption control period based upon, at least in part, a defined interruption control release trigger.

The instruction sets and subroutines of interruption control process 10, which may be stored on a non-transitory storage device (e.g., computer readable medium) 16 coupled to server computer 12, may be executed by one or more processors (not shown) and one or more memory architectures (not shown) incorporated into server computer 12. Non-transitory storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; an intranet; or other communication network, for example.

Server computer 12 may execute one or more server applications, e.g., server application 20. Examples of server application 20 may include, but are not limited to, email server applications that may include calendar and/or scheduling modules or components (e.g., Lotus Domino™ Server and Microsoft Exchange™ Server), instant messaging server applications (e.g., IBM Lotus Sametime™, Microsoft Office Live Communications Server™, Jabber XCP™, and AOL Instant Messenger™), voice over IP server applications or PBX telephone systems, SMS (short message service) applications (i.e., text messaging applications). Server application 20 may interact with client applications 22, 24, 26, 28, examples of which may include, but are not limited to, email client applications that may include calendar and/or scheduling modules (e.g., Lotus Notes™ and Microsoft Outlook™), instant messaging client applications (e.g., AOL Instant Messenger™, IBM Lotus Sametime™, Google Talk™), voice over IP client applications, softphone applications, smart answering machine, and SMS applications. Interruption control process 10 may be a stand alone application that interfaces with server application 20 or an applet/application that is executed within server application 20. Additionally, while not shown, server application 20 and interruption control process 10 may reside on different servers coupled to network 14, 18. Similarly, various applications of the one or more server applications (of which server application 20 is an example) may reside on different servers coupled to network 14, 18.

The instruction sets and subroutines of server application 20, which may be stored on storage device 16 coupled to server computer 12 may be executed by one or more processors (not shown) and one or more memory architectures (not shown) incorporated into server computer 12.

As mentioned above, in addition/as an alternative to being a server-based application residing on server computer 12, the interruption control process may be a client-side application (not shown) residing on one or more client electronic device 38, 40, 42, 44 (e.g., stored on storage device 30, 32, 34, 36, respectively). As such, the interruption control process may be a stand alone application that interfaces with a client application (e.g., client applications 22, 24, 26, 28), or may be an applet/application that is executed within a client application. As such, the interruption control process may be a client-side process, a server-side process, or a hybrid client-side/server-side process, which may be executed, in whole or in part, by server computer 12, or one or more of client electronic device 38, 40, 42, 44.

The instruction sets and subroutines of applications 22, 24, 26, 28, which may be stored on non-transitory storage devices (e.g., computer readable media) 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Non-transitory storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42. notebook computer 44, a data-enabled, cellular telephone (not shown), and a dedicated network device (not shown), for example. Using applications 22, 24, 26, 28, users 46, 48, 50, 52 may, for example, access server application 20 and may, e.g., conduct email communications, schedule/manage calendar events, conduct instant messaging communications, conduct voice communications, browse the internet, and the like.

Users 46, 48, 50, 52 may access server application 20 directly through the device on which the client application (e.g., applications 22, 24, 26, 28) is executed, namely client electronic devices 38, 40, 42, 44, for example. Additionally, one or more user (e.g., user 46 in the illustrated embodiment) may access server application 20 (e.g., which may be a PBX system, or provide a gateway to a PBX system) through telephone 64. Users 46, 48, 50, 52 may access server application 20 directly through network 14 or through secondary network 18. Further, server computer 12 (i.e., the computer that server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Telephone 64 may be directly coupled to network 14 (e.g., which may include a telephone network, such as a PBX network, for example). Additionally, network 14 (which may include a telephone network) may couple server computer 12, executing server application 20 (which may include a PBX gateway or a PBX system) to a public switched telephone network (PSTN) or similar telephone system.

Client electronic devices 38, 40, 42, 44 may each execute an operating system, examples of which may include but are not limited to Microsoft Windows™, Microsoft Windows CE™, Redhat Linux™, or a custom operating system.

Figure 2:
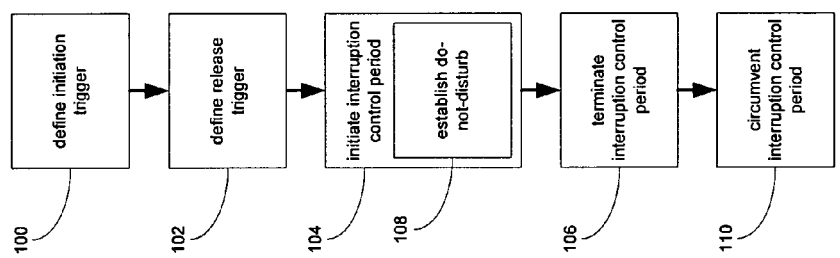
FIG. 2 is a flowchart of a process executed by the interruption control process of FIG. 1.

The Interruption Control Process:

Referring also to FIG. 2, interruption control process 10 may allow a user to define 100 an interruption control initiation trigger and to define 102 an interruption control release trigger. Interruption control process 10 may initiate 104 an interruption control period based upon, at least in part, the interruption control initiation trigger. Additionally, interruption control process 10 may terminate 106 the interruption control period based upon, at least in part, the interruption control release trigger. During the interruption control period, interruption control process 10 may prevent and/or reduce interruptions, e.g., coming from one or more communications channel such as email, instant messaging, voice communication, text messaging, and the like. Similarly, during the interruption control period, interruption control process 10 may make one or more applications (e.g., web browser, games, and the like) unavailable (e.g., by prohibiting access or execution of the application).

As mentioned above, interruption control process 10 may be a stand alone application, or may be an applet or module that runs within another application (e.g., server application 20 and/or applications 22, 24, 26, 28). In either case, interruption control process 10 may allow a user (e.g., user 46) to define 100 the interruption control initiation trigger using a dedicated user interface and/or using an interface embedded/included within another application. Additionally/alternatively, interruption control process 10 may define 100 the interruption control initiation trigger based upon, at least in part, an system wide interruption control policy and/or may allow a third party to define 100 the interruption control initiation trigger.

Figure 3:
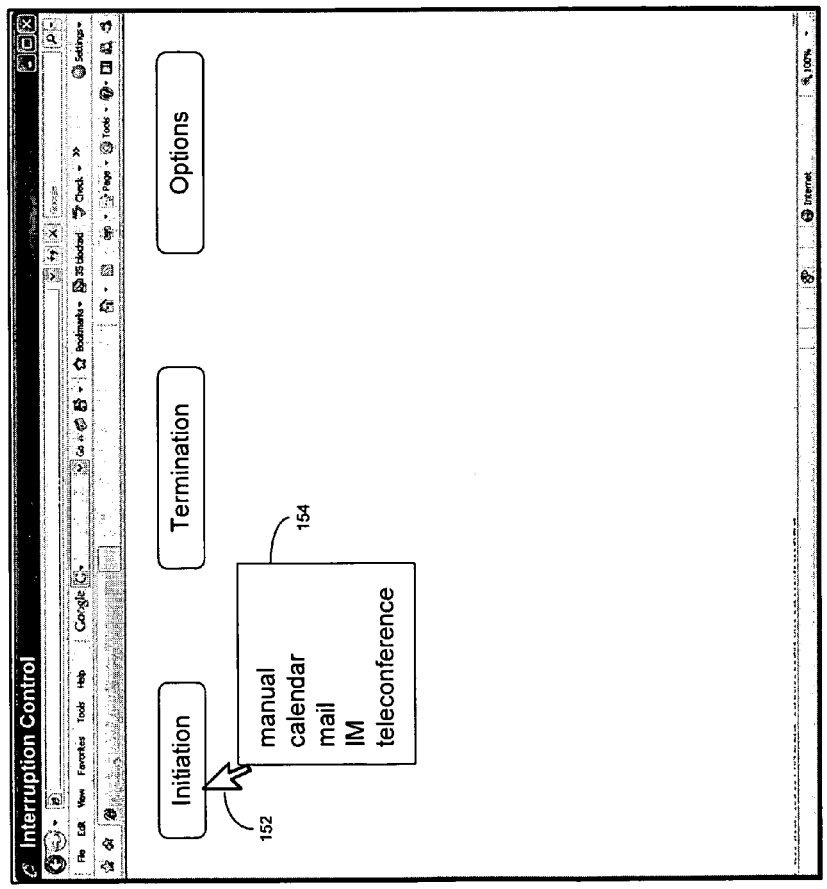
FIG. 3 is a diagrammatic view of a display screen rendered by the interruption control process and/or an application of FIG. 1.

Referring also to FIG. 3, interruption control process 10, alone or in conjunction with another application (e.g., a web browser or client) may render user interface 150 through which user 46 may be allowed to, for example, define 100 the interruption control initiation trigger. User interface 150 may define a plurality of options associated with interruption control process 10 including, but not limited to, "Initiation", "Termination"; "Options". To define 100 interruption control initiation trigger, user 46 may select "Initiation", e.g., using onscreen pointer 152 controlled by a pointing device (e.g., a mouse; not shown), resulting in interruption control process 10 rendering menu 154. Menu 154 may define a plurality of options associated with defining 100 the initiation trigger, including, but not limited to, "manual", "calendar", "mail", "IM", and "teleconference".

Continuing with the above stated example, user 46 may select (e.g., using onscreen pointer 152 controlled by the pointing device) the option "manual" to define 10 the interruption control trigger as a user initiation input. While not shown, the user may be presented with one or more options relative to setting a user initiation input as the defined 100 interruption control initiation trigger. For example, the user may be allowed to initiate 104 the interruption control period immediately, after a predetermined delay, at a predetermined time/date, or various other similar options.

Additionally/alternatively, interruption control process 10 may allow the user to define 100 the interruption control initiation trigger as an interruption control request from an application (e.g., server application 20 and/or one or more of applications 22, 24, 26, 28). Continuing with the above-stated example, using onscreen pointer 152 (controlled by the pointing device; not shown), user 46 may select the option "calendar" from menu 154. The option "calendar" may allow user 46 to define 100 an event scheduled in a calendar (e.g., of a scheduled module associated with an email application) as the interruption control initiation trigger. Similarly, user 46 may select one of mail, IM, and teleconference, and interruption control process 10 may allow user 46 to define an email, instant message, or teleconference as the interruption control initiation trigger (e.g., based on a defined email or instant messaging collaborating party or subject, or based upon a defined teleconference number, such as a teleconference dial-in number).

Further, the interruption control initiation trigger may include an interruption control request from an application. For example, referring also to FIG. 4, in a calendar/scheduling application interface 200 (e.g., rendered by interruption control process 10 and/or an email client application) user 46 may select scheduled appointment 202, e.g., using onscreen pointer 152 and right-clicking on scheduled appointment 202. Right-clicking on scheduled appointment 202 may result in interruption control process 10 and/or email client application rendering "set interruption control" popup 204. User 46 may select "set interruption control" popup 204 (e.g., using onscreen pointer 152 controlled by the pointing device). Selecting "set interruption control" popup 204 may allow the email application (either client-side or server side) to request an interruption control initiation from interruption control process 10, e.g., at the beginning of (or at a predetermined time relative to) scheduled meeting 202.

The application may include one or more of a scheduling application (as described above) and a communication application. In a similar manner as described above with reference to the calendar/scheduling application, interruption control process 10 may allow the user to associate an interruption control initiation trigger with a communication application (e.g., an email application, instant messaging application, voice communication application, or the like). For example, user 46 may define 100 the interruption control initiation trigger as an incoming call from a predetermined user or phone number. As such, when an incoming call is received from the predetermined user of phone number, the voice communication application (e.g., server application 20, which may include a PBX control system) may transmit an interruption control request to interruption control process 10.

Figure 5:
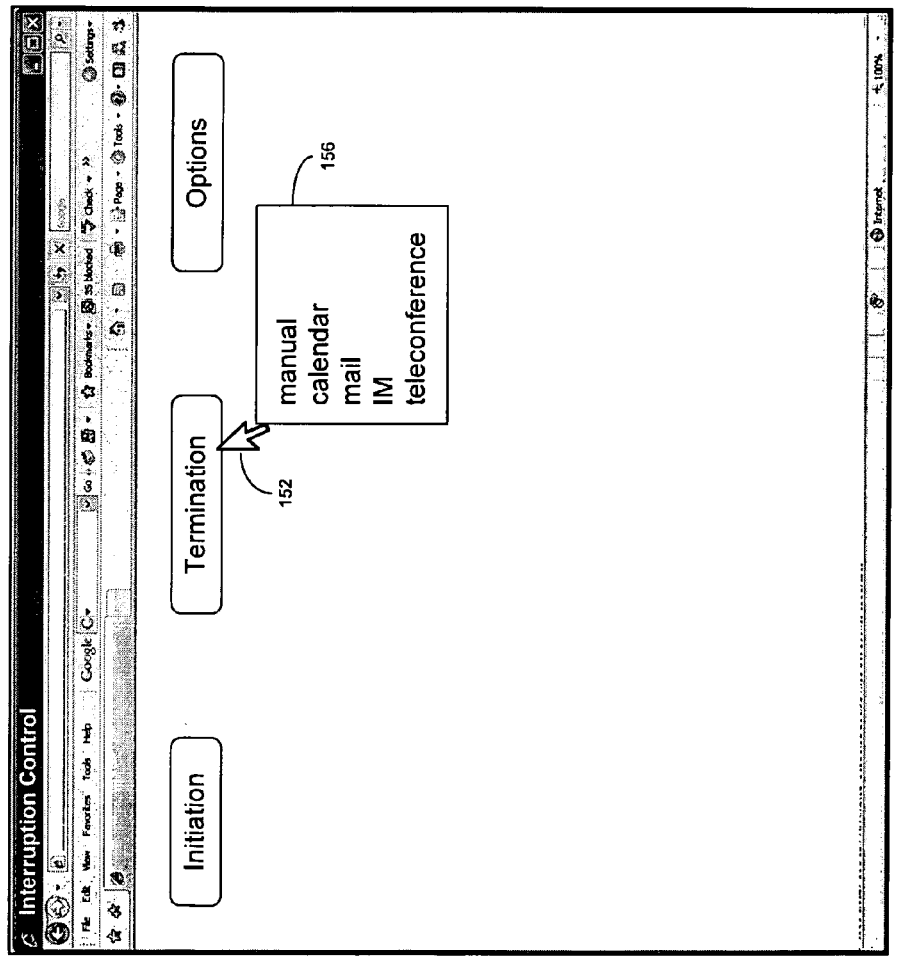
FIG. 5 is a diagrammatic view of a display screen rendered by the interruption control process and/or an application of FIG. 1.

Interruption control process 10 may also allow the user to define 102 an interruption control release trigger. Continuing with the above-stated example, user 46 may define 102 interruption control release trigger by selecting (e.g., using onscreen pointer 152) the "Termination" option in user interface 150. Referring also to FIG. 5, selecting the "Termination" option in user interface 150 may result in interruption control process 10 rendering menu 156. Menu 156 may define a plurality of options including, but not limited to, "manual", "calendar", "mail", "IM", and "teleconference". Similar to defining 100 the interruption control initiation trigger, interruption control process 10 may allow user 46 to select (e.g., using onscreen pointer 152 controlled by the pointing device) the option "manual" to define 10 the interruption control trigger as a user release input. While not shown, the user may be presented with one or more options relative to setting a user release input as the defined 100 interruption control initiation trigger. For example, the user may be allowed to release 104 the interruption control period immediately, after a predetermined delay, at a predetermined time/date, or various other similar options.

Figure 4:
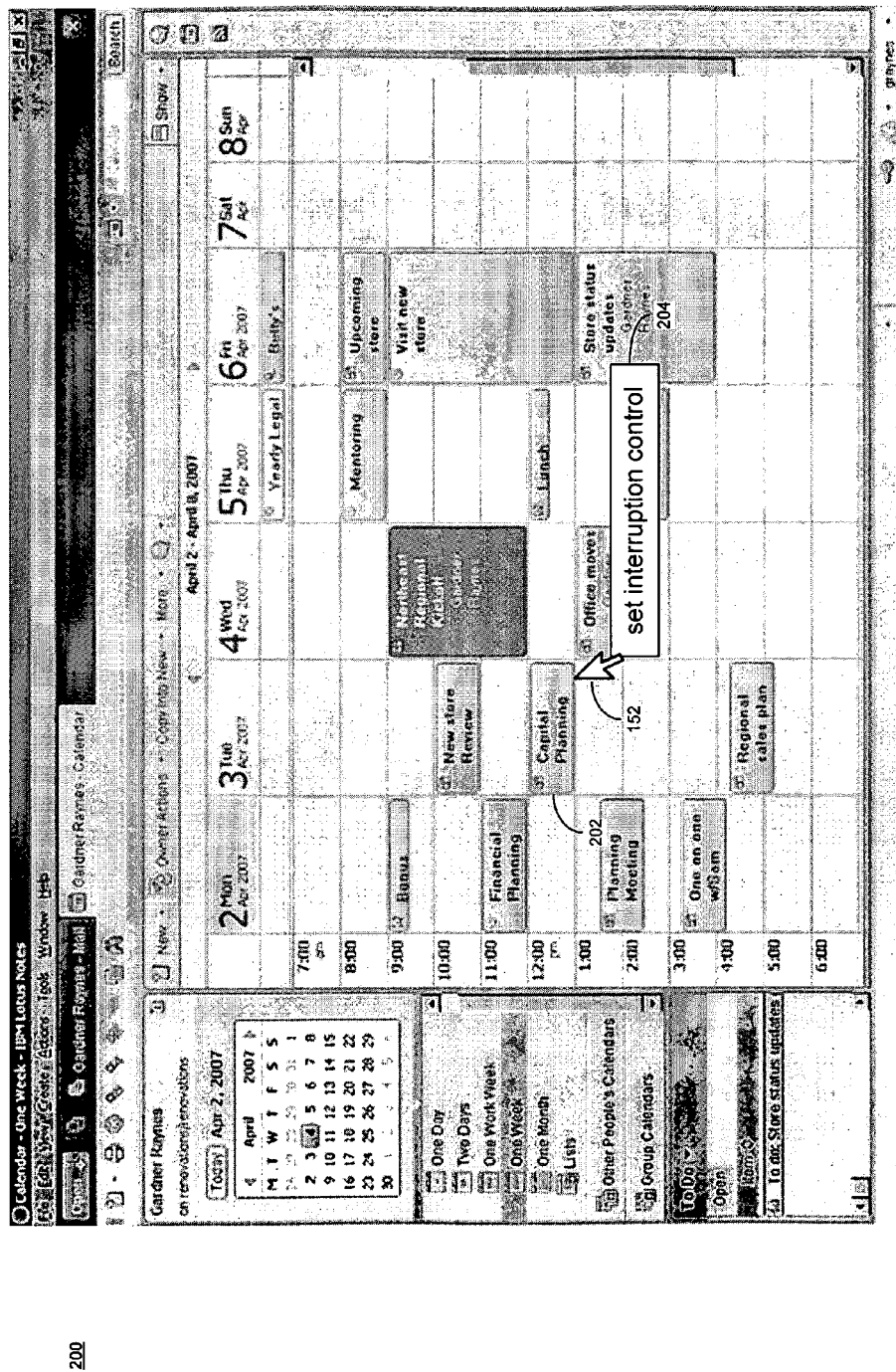
FIG. 4 is a diagrammatic view of a display screen rendered by the interruption control process and/or application of FIG. 1.

In addition/as an alternative to a user input, the interruption control release trigger may include a release request from an application. The application may include one or more of a scheduling application and a communication application. For example, as shown in FIG. 4, user 46 may associate the interruption control initiation trigger with scheduled meeting 202. Interruption control process 10 may similarly associate the interruption control release trigger with scheduled meeting 202. As such, calendar/scheduling application may transmit an interruption control release request at the end of (or at a predetermined time relative to) scheduled meeting 202. In a similar manner, a communication application (e.g., email, instant messaging, or voice communication application) may transmit an interruption control release request, for example, at the end of (or a predetermined time relative to) a chain of email correspondence, instant message exchange, or voice call.

Additionally, the interruption control release trigger may include a timer. For example, while not shown, user 46 may select the "manual" option in menu 156, resulting in interruption control process 10 prompting user 46 to input a timing value for the timer. User 46 may input a timing value (e.g., in terms of a timing duration, an end time, etc.). Interruption control process 10 may define 102 the interruption control release trigger as the expiration of the timing value (e.g., the expiration of the timing duration or the set end time).

Figure 6:
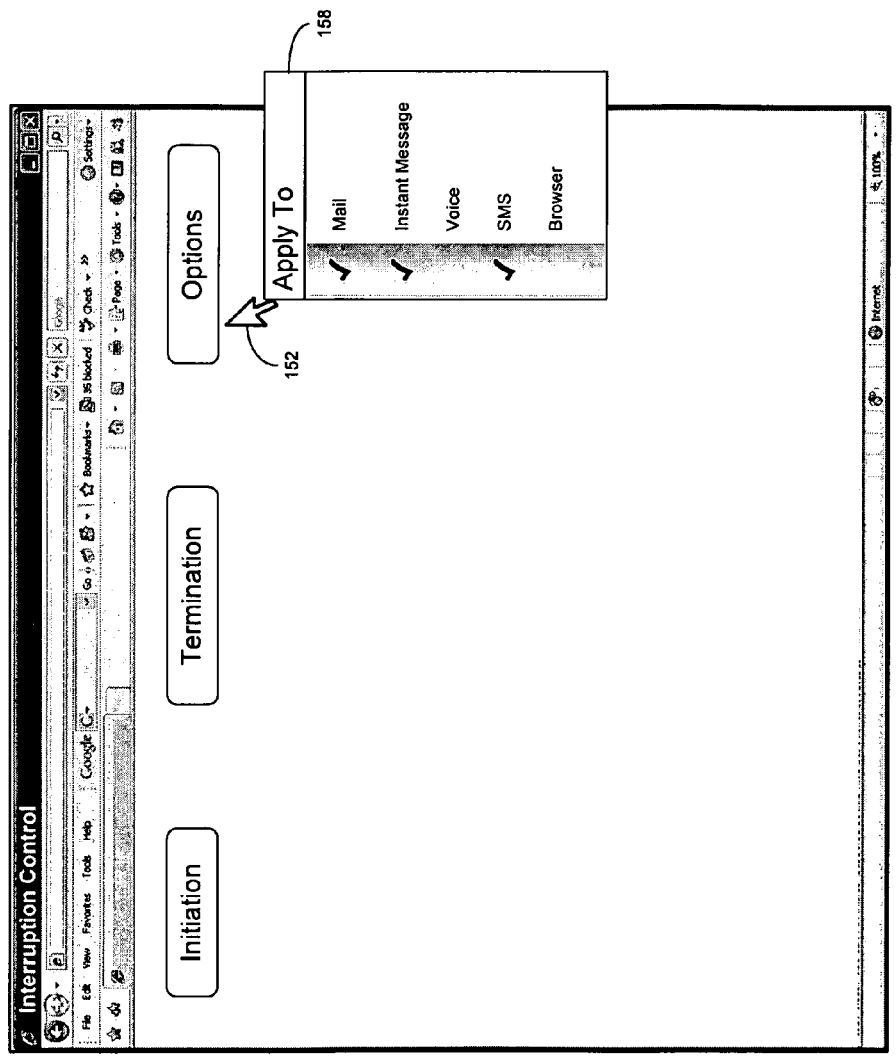
FIG. 6 is a diagrammatic view of a display screen rendered by the interruption control process and/or an application of FIG. 1.

In addition to setting the interruption control initiation and/or release trigger, interruption control process 10 may allow the user to set a variety of options relative to the interruption control process. Referring also to FIG. 6, user 46 may select (e.g., using onscreen pointer 152 controlled by the pointing device) "Options" in user interface 150, resulting in interruption control process rendering menu 158. Menu 158 may allow user 46 to apply the interruption control to a plurality of applications including, but not limited to, email, instant messaging, voice, SMS, and a web browser. For example, as shown, user 46 may apply the interruption control to mail, instant messaging, and SMS, but not to voice or to the web browser. Various other options may also be provided.

Based upon, at least in part, the interruption control initiation trigger, interruption control process 10 may initiate 104 an interruption control period. Initiating 104 the interruption control period may include interruption control process 10 interacting with (e.g., issuing a command to) server application 20 to initiate 104 the interruption control period. For example, if the interruption control initiation trigger is associated with scheduled appointment 202, interruption control process 10 may initiate 104 the interruption control period at the scheduled start time (or a predetermined time relative to the scheduled start time) of scheduled meeting 202. Similarly, interruption control process 10 may initiate 104 the interruption control period based upon, at least in part, other defined 100 interruption control initiation triggers, such as user input, interruption control request from an application, and the like.

Initiating the interruption control period may include establishing 108 a do-not-disturb status for one or more communication channel. Continuing with the above-stated example, in which the interruption control may be applied to email, instant messaging, SMS, and voice communication (as well as various other communication channels), initiating 104 the interruption control period may include establishing 108 a do-not-disturb status for, e.g., email, instant messaging, SMS, and voice communication. The do-not-disturb status established during the interruption control period, may cause interruption control process 10 to reject incoming emails, instant messages, text messages, voice communications, etc., sent to user 46. For example, interruption control process 10 may interact with (e.g., issue a command to) server application 20 to establish the do-not disturb status for the various communication channels. The rejected emails, instant messages, and text messages may be stored for later delivery to user 46 (e.g., once the interruption control period has been terminated), or may be blocked without being stored.

Establishing 108 a do-not-disturb status for SMS may include, for example, forwarding SMS messages to a control point (e.g., a data store, in which the SMS message may be saved, e.g., for later delivery). Initiating 104 the interruption control period for SMS may include, for example, transmitting a request to a mobile phone operator (or other operator responsible for handling routing and delivery of SMS messages) to forward SMS messages for user 46 to the control point. Similarly, initiating 104 the interruption control period for telephone communications, e.g., on a PSTN, may include, for example, transmitting a request to a PSTN telephone provider to forward telephone calls to user 46 to a control point (e.g., which may include a telephone answering system, such as a voicemail system). Similarly, initiating 104 the interruption control period for PBX based voice communications may include, for example, transmitting a request to a PBX control system (e.g., which may include server application 20) to forward telephone calls for user 46 to a control point (e.g., which may include a telephone answering system, such as a voicemail system) Various other mechanisms may be employed for establishing 108 a do-not-disturb status for SMS, telephone, and other communication channels.

Interruption control process 10 may send a notification to an email, instant message, or text message sender, e.g., as a return communication, via a do-not-disturb user interface semantic (e.g., in a sender's instant messaging user interface), or similar notification. Additionally, as mentioned above, interruption control period may disable other applications, including, but not limited to, preventing a web browser from being launched, for example.

Interruption control process 10 may terminate 106 the interruption control period based upon, at least in part, the interruption control release trigger. Continuing with the above-stated example in which the initiation control release trigger is associated with scheduled meeting 202, interruption control process 10 may terminate 106 the interruption control period at the scheduled end time (or a predetermined time relative to the scheduled end time) of scheduled meeting 202. Interruption control process 10 may terminate 106 the interruption control period based upon, at least in part, other defined 102 interruption control release triggers, such as user input, release request from an application, the expiration of the timing value, or the like.

Terminating 106 the interruption control period may result in interruption control process 10 releasing the do-not-disturb status of the one or more communication channels. Continuing with the above-stated example, releasing the do-not-disturb status established during the interruption control period, may cause interruption control process 10 to allow incoming emails, instant messages, and text messages sent to user 46. Additionally, if communications rejected during the interruption control period were stored, releasing the do-not-disturb status may result in any stored communications being delivered to user 46.

Interruption control process 10 may allow the interruption control period to be circumvented 110 based upon, at least in part, a predetermined circumvention policy. For example, the predetermined circumvention policy may allow the interruption control period to be circumvented by specified user (such as user 46's supervisor) or under predetermined conditions (e.g., an indicated high priority of a communication). Circumventing 110 the interruption control period may include allowing communications to be delivered to user 46 notwithstanding the established 108 do-not-disturb status. For example, the circumvention policy may allow user 46's superior to circumvent 110 the interruption control period. As such, an email sent to user 46 by user 46's superior may be delivered to user 46 during the interruption control period.

A number of implementations have been described. Nevertheless, it will be understood that various modifications may be made. Accordingly, other implementations are within the scope of the following claims.

What is claimed is:

1. A method comprising:
    in response to a selection of one or more of email, instant message, SMS, and teleconference, allowing a user to define, on a computer running an interruption control process, at least one of an email, instant message, and teleconference as an interruption control initiation trigger;
    defining, on the computer running the interruption control process, an interruption control release trigger, wherein the interruption control release trigger includes a release request transmitted from an application at the end of at least one of a chain of email correspondence, an instant message exchange, and a voice call;
    initiating, on the computer running the interruption control process, an interruption control period, associated with a plurality of communication channels, and based upon, at least in part, the interruption control initiation trigger; and
    terminating, on the computer running the interruption control process, the interruption control period based upon, at least in part, the interruption control release trigger;
    wherein terminating the interruption control period includes determining the type of one or more communication systems associated with the selection of the one or more of email, instant message, SMS, and teleconference.

2. The method of claim 1, wherein initiating the interruption control period includes establishing a do-not-disturb status for one or more of the plurality of communication channels.

3. The method of claim 1, wherein the interruption control initiation trigger includes at least one of:
    a user initiation input; and
    an interruption control request from an application.

4. The method of claim 3, wherein the application includes one or more of a scheduling application and a communication application.

5. The method of claim 1, wherein the interruption control release trigger includes a user release input.

6. The method of claim 1, wherein the application includes one or more of a scheduling application and a communication application.

7. The method of claim 1, wherein the interruption control release trigger includes a timer, and terminating the interruption control period includes terminating the interruption control period after a predetermined period of time.

8. The method of claim 1, further including circumventing the interruption control period based upon, at least in part, a predetermined circumvention policy.

9. A computer program product residing on a computer readable medium having a plurality of instructions stored thereon which, when executed by a processor, cause the processor to perform operations comprising:
    in response to a selection of one or more of email, instant message, SMS, and teleconference, allowing a user to define at least one of an email, instant message, and teleconference as an interruption control initiation trigger;
    defining an interruption control release trigger, wherein the interruption control release trigger includes a release request transmitted from an application at the end of at least one of a chain of email correspondence, an instant message exchange, and a voice call;
    initiating an interruption control period, associated with a plurality of communication channels, and based upon, at least in part, the interruption control initiation trigger; and
    terminating the interruption control period based upon, at least in part, the interruption control release trigger;
    wherein terminating the interruption control period includes determining the type of one or more communication systems associated with the selection of the one or more of email, instant message, SMS, and teleconference.

10. The computer program product of claim 9, wherein the instructions for initiating the interruption control period include instructions for establishing a do-not-disturb status for one or more of the plurality of communication channels.

11. The computer program product of claim 9, wherein the interruption control initiation trigger includes at least one of:
    a user initiation input; and
    an interruption control request from an application.

12. The computer program product of claim 11, wherein the application includes one or more of a scheduling application and a communication application.

13. The computer program product of claim 9, wherein the interruption control release trigger includes a user release input.

14. The computer program product of claim 9, wherein the application includes one or more of a scheduling application and a communication application.

15. The computer program product of claim 9, wherein the interruption control release trigger includes a timer, and the instructions for terminating the interruption control period include instructions for terminating the interruption control period after a predetermined period of time.

16. The computer program product of claim 9, further including instructions for circumventing the interruption control period based upon, at least in part, a predetermined circumvention policy.

17. The method of claim 1, wherein initiating the interruption control period includes transmitting a request to a telephone provider to forward telephone calls to a control point.

18. The computer program product of claim 9, wherein initiating the interruption control period includes transmitting a request to a telephone provider to forward telephone calls to a control point.

19. The method of claim 1, wherein at least one of the email, instant message, and teleconference defines the interruption control initiation trigger based upon, at least in part, at least one of a collaborating party, a subject, and a telephone conference number associated with at least one of the email, instant message, and telephone conference.

20. The computer program product of claim 9, wherein at least one of the email, instant message, and teleconference defines the interruption control initiation trigger based upon, at least in part, at least one of a collaborating party, a subject, and a telephone conference number associated with at least one of the email, instant message, and telephone conference.

\* \* \* \* \*